United States Patent [19]
Smith

[11] Patent Number: 5,559,871
[45] Date of Patent: Sep. 24, 1996

[54] CALL CHARGE CONTROL AND NOTIFICATION

[75] Inventor: David B. Smith, Hinsdale, Ill.

[73] Assignee: Lucent Technologies Inc., Del.

[21] Appl. No.: 311,638

[22] Filed: Sep. 23, 1994

[51] Int. Cl.$^6$ .......................... H04M 15/00; H04M 17/00
[52] U.S. Cl. .......................... 379/115; 379/121; 379/144
[58] Field of Search ...................... 379/111, 112, 379/114, 115, 121, 720, 130, 131, 143, 144, 155, 67, 88

[56] References Cited

U.S. PATENT DOCUMENTS

| | | | |
|---|---|---|---|
| 4,706,275 | 11/1987 | Kamil | 379/144 |
| 4,726,056 | 2/1988 | An et al. | 379/115 |
| 4,757,186 | 7/1988 | Heberle et al. | 379/144 X |
| 5,109,401 | 4/1992 | Hattori et al. | 379/131 X |
| 5,353,335 | 10/1994 | D'Urso et al. | 375/115 X |
| 5,359,182 | 10/1994 | Schilling | 379/144 X |

OTHER PUBLICATIONS

AT&T Portable Cellular Telephone 3810 Owner's Manual, 1994, 1 page.

*Primary Examiner*—Stephen Chin
*Assistant Examiner*—Paul Loomis
*Attorney, Agent, or Firm*—Dennis J. Williamson; Werner Ulrich

[57] ABSTRACT

A limit is placed on charges to be incurred on a telecommunications call. Normally, this limit is specified by the caller. The telecommunications network maintains a running tally of the charges being incurred and notifies the caller when the charges approach the limit. At that time, the caller may specify a new limit, simply disconnect, or be automatically disconnected when the limit is reached. Advantageously, callers can limit the charges on a particular call without having to be aware of the exact charging parameters for that call.

15 Claims, 10 Drawing Sheets

| CASE | ACTION | SERVICE ORDER REQUIRED | OPTIONS |
|---|---|---|---|
| DEFAULT (BASED ON SWITCH PARAMETERS; FOR ALL USERS SERVED BY THE SWITCH) | CALLING PARTY ENTERS ACTIVATION CODE (e.g. *46) FOLLOWED BY PROMPT FOR DOLLAR LIMIT. USER ENTERS DOLLAR AMOUNT. | NO | AUDIBLE/VISUAL NOTICE AT SET TIME BEFORE USER DETERMINED LIMIT IS REACHED (e.g. 10 SECONDS). NO FURTHER ACTION IS TAKEN. |
| LEVEL 1 SUBSCRIBER SERVICE | SUBSCRIBER SERVICE ORDER REQUIRED | YES USAGE NOTICE AT SUBSCRIBER SET INCREMENTS. NOTICE ONLY. | AUDIBLE/VISUAL NOTICE AT USER DETERMINED DOLLAR INCREMENTS BASED ON CUSTOMER PROFILE (e.g. NOTICE EVERY $1.00, NO LIMIT). |
| LEVEL 2 SUBSCRIBER SERVICE | AUTOMATIC NETWORK PROMPT FOR SUBSCRIBER LIMIT. LIMITS ENTERED OR SERVICE TURNED OFF. PROMPT FOR LIMIT TREATMENT SELECTION OR DEFAULT. | YES | LEVEL 1, PLUS PER CALL LIMITS: 1.) NOTICE ONLY AT USER ENTERED LIMIT; 2.) NOTICE AND TERMINATION; 3.) NOTICE, NEW LIMIT ENTRY. |
| LEVEL 3 SUBSCRIBER SERVICE (LEVEL 3 INCLUDES OPTIONS AS DESCRIBED IN LEVEL 2, IN ADDITION TO LEVEL 3 OPTIONS.) | NETWORK PROMPT FOR: PIN # | NOTICE AND ACTION OPTIONS. YES DAILY, WEEKLY AND MONTHLY LIMITS SET IN SERVICE ORDER RECORD, ASSIGNED TO PIN #. ABILITY TO CANCEL LIMITS ASSOCIATED WITH PIN #. | SERVICE PERMITS: 1.) DAILY, WEEKLY, MONTHLY CUMULATIVE USAGE LIMITS (CHECKED & MONITORED) MESSAGE AND/OR TERMINATION WHEN LIMIT IS REACHED; 2.) CANCEL LIMIT; 3.) MULTIPLE PIN #'s; 4.) CALL CHARGED TO CREDIT # (INCLUDED/NOT INCLUDED IN LIMITS) |

CALL CHARGE CONTROL AND NOTIFICATION

TECHNICAL FIELD

This invention relates to a method and apparatus for permitting telephone callers to improve their management of charges for their calls.

PROBLEM

In general, when a telephone user places a call, the user is unaware of the exact charges that are incurred for the call, specifically, how changes relate to the usage time. With rates changing frequently, it is difficult to know of the charges, even based on past experience. An exception is made for coin/toll calls, operator assistance calls in which the caller specifically requests that he/she be notified of the cost of the call after the call has been completed or certain hotel billing services wherein the hotel must be notified almost immediately of the charges incurred in the call in order to charge their customers on checkout. These services are premium services for which the caller must pay a substantial surcharge; furthermore, with the exception of some coin calls, the caller does not find out about charges until after the call has been completed, a time when it is too late to do anything about the charges, thus to use this information to decide to continue or terminate the call. For customer-dialed calls which do not require the assistance of an operator, the customer usually finds out the charge for a particular call when she/he receives a monthly bill. In many cases, customers are surprised by the size of the charge for a call in either direction, i.e., that they had expected to pay more for the call and would have continued to talk longer, or that they had expected to pay less and would have terminated sooner. A problem of the prior art therefore is that there is no economical arrangement whereby customers can manage the charges for individual calls, or on a daily, weekly or monthly basis.

SOLUTION

The above problem is solved and an advance is made over the prior art in accordance with applicant's invention wherein a new feature is offered by the telephone network or adjunct to the network which permits a customer to pre-specify the limit of charges that the customer is willing to pay for a call or notifies the customer when specified charge amounts are reached. Advantageously, this permits the customer to control the charges that are actually incurred for that call, thus matching a customer's willingness to pay with the actual charges incurred.

In accordance with one preferred embodiment, all customers are provided with a basic service whereby they can specify the charge that they are willing to accept for a particular call, prior to placing that call, by dialing a special feature access number, such as *46 (or 1146 for rotary telephones) to be followed by an indication of the amount of the charge that they are willing to accept. As the charge being incurred for the call approaches the limit, the calling customer is notified by a prompt or a tone, or a visual indicator to a video or other display telephone, and can either terminate (deliberately or automatically) the call before the limit charge is reached, or reauthorize an additional charge or cancel the limits on this call. Alternatively, the customer may receive only a notification and is free to continue incurring charges for the call. Advantageously, these arrangements permit a customer to flexibly control the charge to be incurred on a particular call.

In accordance with another feature of applicant's invention, customers are assigned a class of service describing the particular features of their call charge control arrangement. These features include an absolute upper limit, personal identification numbers to override such a limit or to substitute a higher limit, limits for specialized calls (such as 900 calls); and a plurality of personal identification numbers, each with its own set of limits. In accordance with another aspect of applicant's invention, a cumulative limit may be set for certain types of calls (such as 900 calls) the limit being for a particular time (hour and day or month); again, the limit being subject to override through the use of a personal identification number (PIN) other methods of verifying the authority of the caller to make such changes, such as voice recognition, can be used instead of a PIN. Advantageously, the use of multiple personal identification numbers may give broader privileges, for example, to the adults of the household while limiting the privileges of teenagers or younger children.

In accordance with another aspect of the invention, this arrangement can be provided for collect calls wherein the receiving party specifies the limit. Advantageously, this protects the receiver of a collect call from being charged an excessive amount through failure to monitor the duration of the call, or through ignorance of the source location of the call.

While these arrangements can be used for any type of call whose charges are dependent on the length of the call, the arrangement is especially useful for international calls whose charges typically are substantially higher than domestic or local toll charges, and may have greater variations according to time of day and/or day of week.

DETAILED DESCRIPTION

Figure 1:
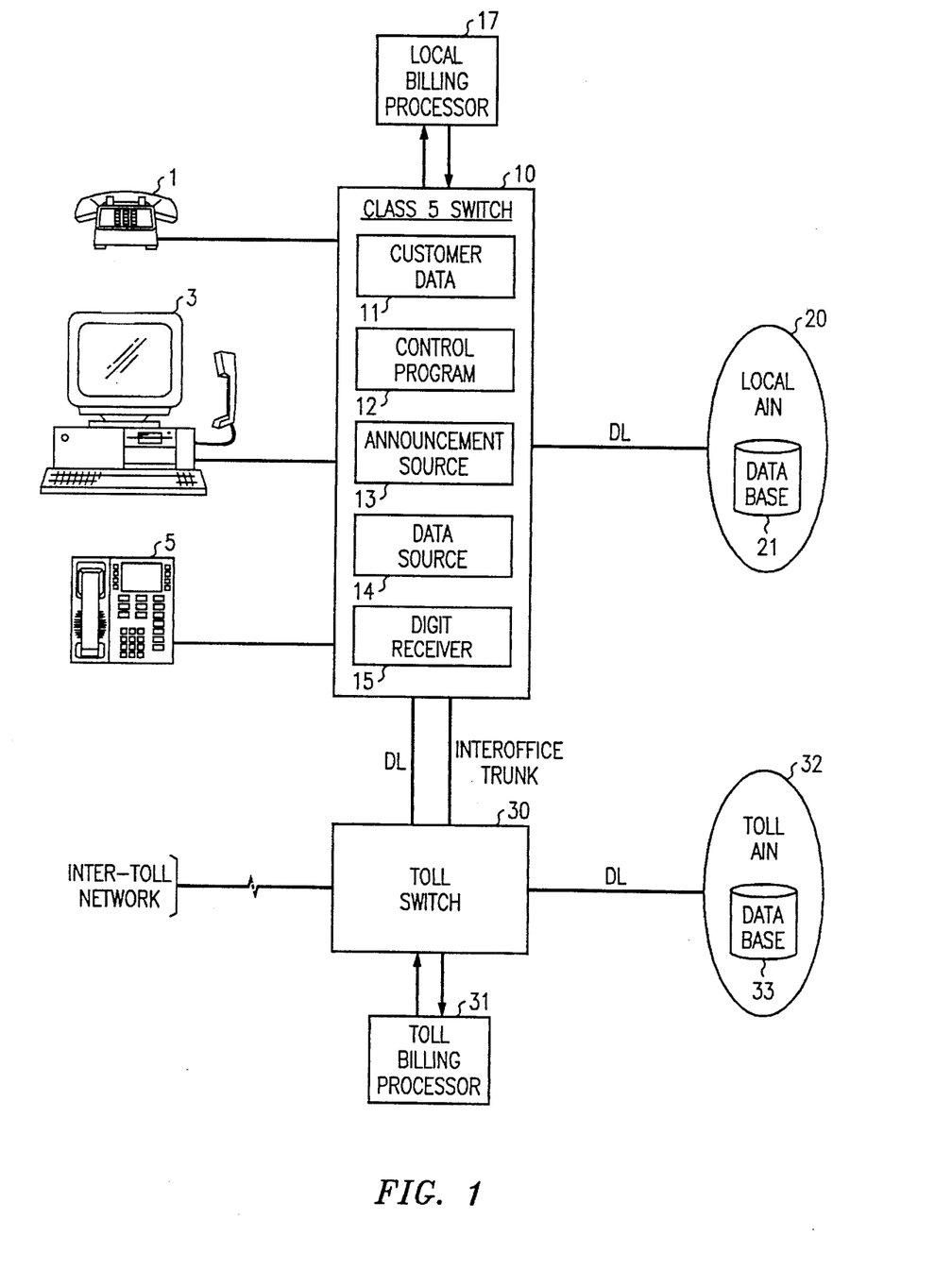
FIG. 1 is a block diagram of a system for implementing applicant's invention in the context of a public switched network and FIG. 2 is an arrangement for implementing applicant's invention within a private branch exchange.

FIG. 1 is a block diagram illustrating the operation of applicant's invention. A plurality of telephones, such as conventional telephone set 1, personal computer (PC) based telephone 3, "smart phone" (such as an analog display services interface (ADSI) telephone 5 available, for example, from Northern Telecom, Inc. are connected to a central office, a class 5 switch, such as AT&T's 5ESS® 2000 switch. The central office is controlled by a control program 12 stored therein. The central office contains customer data 11 for specifying specialized features for the customers connected to the classified switch. The central office also contains an announcement source for providing prompts to the telephone users connected to the switch; a data source 14 for providing data messages to units such as the PC-based telephone 3 or the ADSI telephone 5 and digit receivers 15 for receiving telephone numbers and other data keyed in by customers. The switch 10 accesses billing information in local billing tables stored, for example, in an adjunct processor 17 or may access the local advanced intelligent network (AIN) 20 to obtain billing data from a database 21 of the local AIN. For toll calls, the central office 10 is connected by an interoffice trunk to a toll switch 30 for toll connections. The toll switch 30 is connected to its own toll billing processor 31 which contains billing tables or can access a toll AIN 32 which has billing data in a database 33. The central office 10 can access the toll switch 30 through a data link to obtain the required billing data that the toll switch can access.

Basically, in accordance with applicant's invention, a customer dials an access code, such as *46 to indicate the desire to place a call for which he/she wishes to control the charges. (If the caller has a more sophisticated telephone set, a specialized key or other specialized operation can be used to accomplish the same result.) In accordance with a preferred embodiment, switch 10 responds with a tone followed by an announcement such as "please enter the amount in dollars of the limit for charges for this call". The caller will then enter the amount and dial the called number (alternatively, the called number can be dialed before the customer receives the prompt and before a customer dials the charge limit). The switch then consults the billing tables in billing processor 17 or sends a data message to the local AIN 20 to obtain billing information or sends a message over the data link to toll switch 30 to obtain billing information. After the call has been established, the switch 10 monitors the length of the call and the accumulated charges associated with this length and announces a warning to the caller that the time associated with the limit charge has almost elapsed (for PC-based telephone 3 or ETSI telephone 5 a data message can be sent to the caller and displayed for the callee's use), in accordance with the service options selected (or defaulted) by the calling party. In response to this announcement tone or data message, the caller completes the call, the caller terminates the call or alternatively enters additional data to request an extension.

Figure 2:
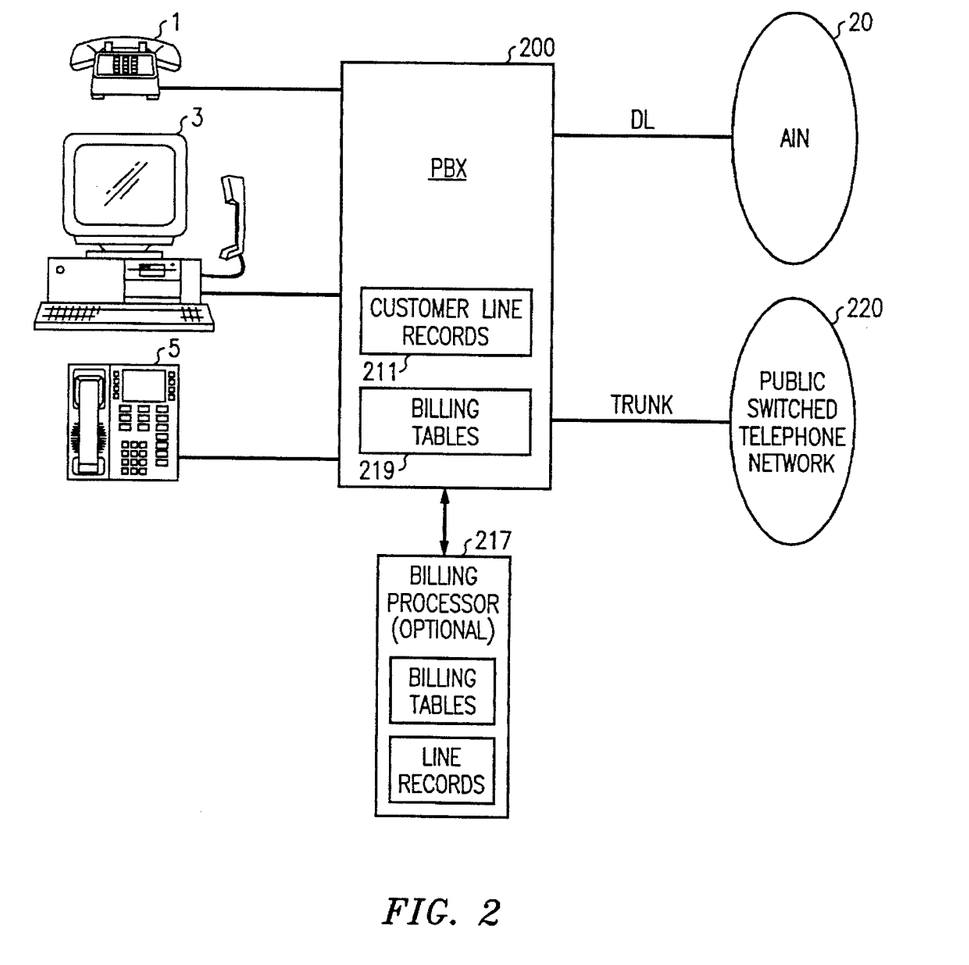

FIG. 2 shows the operation of applicant's invention if the caller's telephone is connected to a private branch exchange (PBX) 200. This PBX contains customer line records 211, billing tables 219 and if an optional billing processor is used, billing tables and line records in that billing processor 217. In addition, the PBX can access a database in AIN 20. The PBX is connected by a PBX trunk to public switched network 220. The trunk may terminate on either a classified central office 10 or on a toll switch 30. Basic operation in the PBX environment is the same, except that the control of the customer line records and billing tables is by the system administrator of the PBX and not the telephone company administration.

Figure 3:
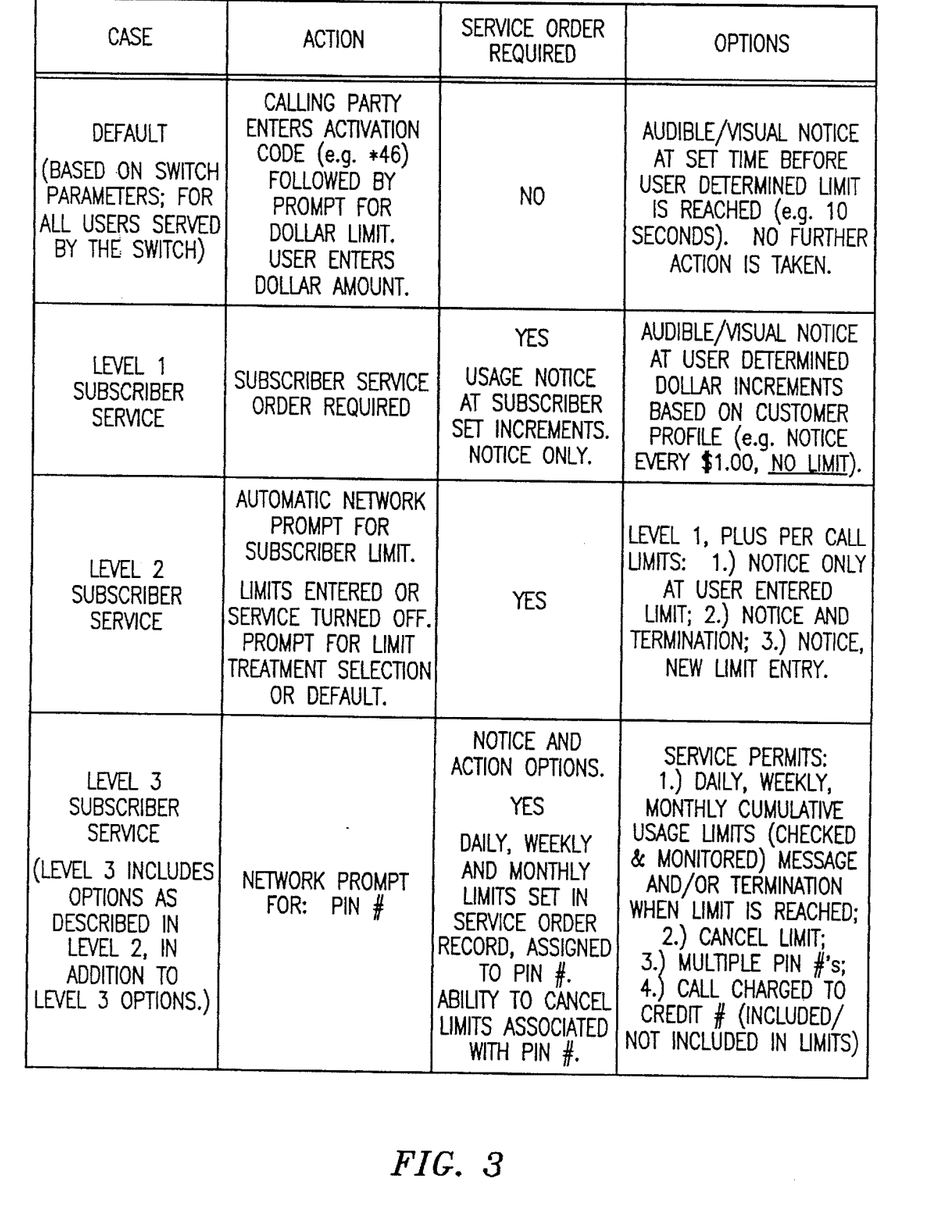
FIG. 3 is a layout of data for a customer who wishes to have flexibility in the control of charges for calls.

FIG. 3 is a description of the options available to customers for this type of service. The option information is stored along with other class information in the office database or in the translation information for each customer that is pan of the office database. In this illustrative embodiment, the default option is provided for all customers and does not require any special translation information. The default option is used by the switch in the absence of specific translation information for a calling customer. The default options in a general case are based on the parameters stored for a switch. In a specific preferred embodiment, the default option is as follows: if the calling party enters an activation code (for example, *46), the caller receives a prompt for a dollar amount and enters this dollar amount. An audible or visual notice, depending on the type of telephone instrument used by the caller, is sent a set time before the customer specified limit is reached (for example, 10 seconds earlier). No further action is taken; the customer may choose to ignore the notice and simply go on with the conversation.

For level 1 subscriber service, translation information must be stored for that customer, so a service order is required. In the service order the customer specifies the increments at which the subscriber is to be notified of charges. The customer is then notified throughout the call every time an increment is passed. There is no automatic limiting of the length of the call.

With level 2 subscriber service, the telecommunications network automatically prompts the customer for a limit. While this prompting may initially be an announcement, it may subsequently be a specialized tone. The preferred embodiment, as described hereinafter, indicates that a caller specifies the charged limit before dialing the number; however, for level 2 subscriber service, an alternate arrangement, which may be preferable, is that the prompt for a subscriber limit is presented after the number has been dialed and after the switch recognizes that this is a toll call. In response to the prompt, the subscriber either enters a limit, or simply indicates (for example, by keying #) that the service not be used on this call. Another option available with appropriate translation information is that on all toll calls a default limit is specified. The options for this service include the options available for level 1 service plus the pre-specified per call limits, and an option either to give only notice of an impending limit charge, to give notice and terminate the call, and to give notice and allow for a new limit entry.

For level 3 subscriber service, the same options available for level 2 are also available and, in addition, the telecommunications network prompts the subscriber to enter a personal identification number (PIN). In the service order, a customer may set daily, weekly, and monthly limits on charges to be incurred for each PIN and an option to allow the caller to cancel the limits associated with specific PIN numbers. The service permits daily, weekly, or monthly cumulative usage limits with a notification and/or termination when the limit is reached, an option to cancel a limit, options to have multiple PINs, PIN numbers with different privileges associated with each limit, and the option to override a limit if the call is charged to a credit number prior to reaching the limit. Credit card calls can or cannot be included in the cumulative total being accumulated at the subscriber's option. The default option is also available to level 1, 2 and 3 customers if this is the type of service they want in a particular case for a particular call.

Limits can always be exceeded for emergency calls such as calls to 911.

Figure 4A:
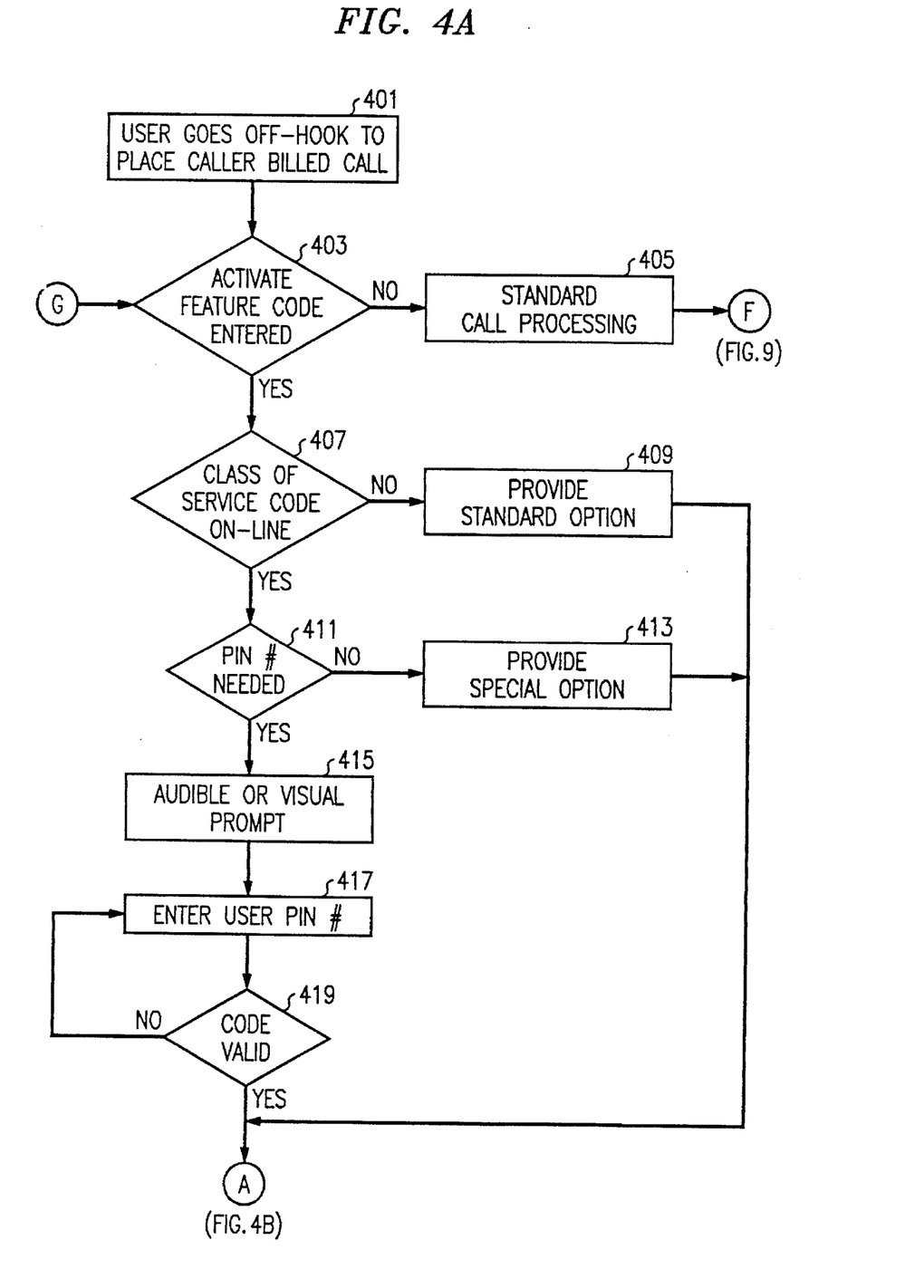
FIGS. 4–10 are flowcharts for implementing applicant's invention.
Figure 4B:
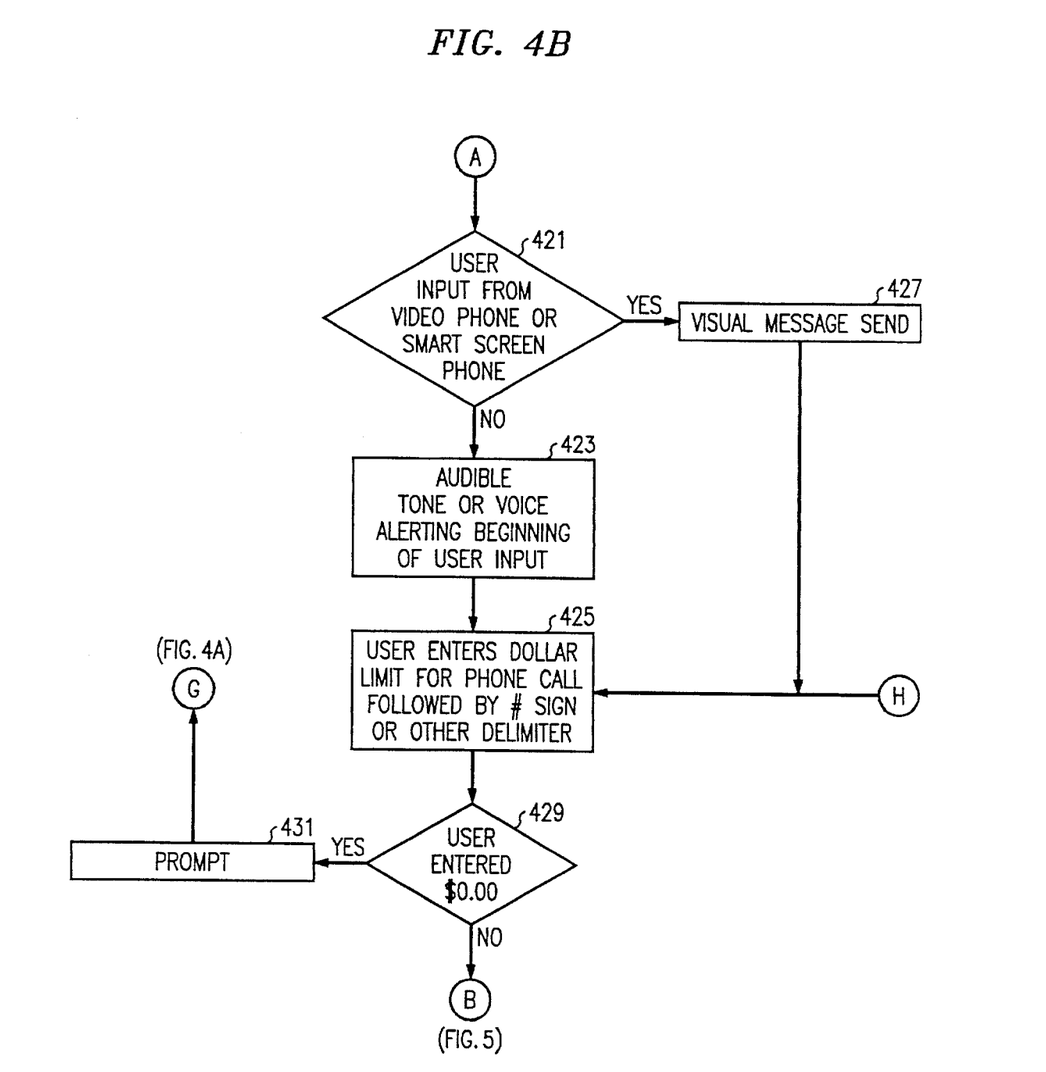
Figure 5:
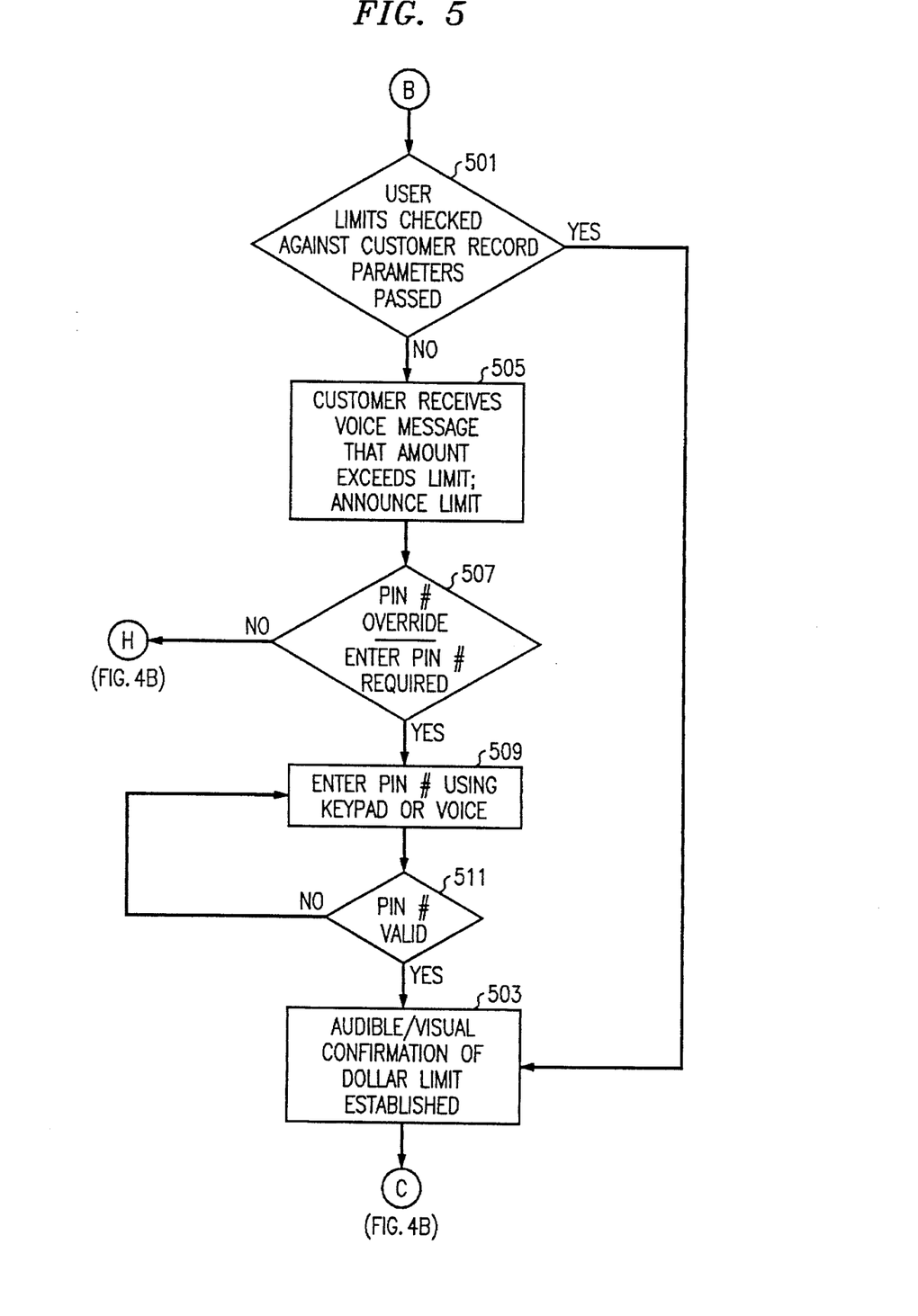

FIG. 4 is a flow diagram showing the steps required for activating the service on a particular call and entering the appropriate data. Action block 401 shows that the user goes off-hook to place a call caller billed call. For calls not billed to the caller, such as conventional 800 calls, there is no need for the caller to limit charges. Test 403 determines whether or not the user has activated the feature code by dialing *46. If not, then standard call processing is performed (action block 405). This standard call processing includes the features described in FIG. 9 for limiting overall customer charges. If the activate feature code has been entered then test 407 is used to determine whether there is a special class of service on the line. If not, the default standard option is provided (action block 409) and test 421 to be described subsequently, is entered. If the caller has a special class of service describing special features for use with limiting call charges, then test 411 is entered to see if an initial personal identification number (PIN) is needed. If not, then the special option for that class is directly supplied to test 421 to be described hereinafter. If a PIN is needed, then an audible prompt (for telephone, such as telephone 1 or a visual prompt for telephones such as telephone 3 or 5) is supplied to the caller (action block 415) and in response the user enters a PIN (action block 417). Test 419 is used to determine if the PIN is valid, if not, the user is prompted to try entering the PIN again, presumably with a limited number of trials. If the code is valid, then test 421 is entered to determine whether an audible or visual prompt should be provided to request the customer to specify the dollar amount. If a visual prompt is required, then a visual message is sent (action block 427) and action block 425 is entered. If an audible prompt is required, then an audible tone and/or voice alerting is provided to the customer to request that he/she enter the dollar limit. In action block 425, the user enters the dollar limit for the phone call followed by a "#" or other delimiter. Test 429 determines whether the user entered an amount of zero dollars. If so, action block 431 provides a second prompt requesting whether the user wishes to reenter a limit or to cancel the limit request. Test 433 checks whether the user has requested a limit reentry. If so, action block 425 is reentered; if not, standard call processing (action block 405) is performed. The number of retries can be limited, for example, to two retries. If the user did not enter a zero amount, then FIG. 5 is entered at test 501.

Test 501 checks the user limit against the customer record parameters. If the user limits are less than the customer record parameters then the user receives an audible or visual confirmation of the dollar limit established (action block 503). If the user has exceeded the limit specified in the user parameters, the customer receives a voice message that the amount exceeds the limits and the allowable limit is provided (action block 505). Test 507 determines whether the user may override the limit with an appropriate PIN. If not, then action block 425 is entered and the user can specify an alternate limit. If the user has override capabilities, then the user enters a PIN (action block 509) and test 511 determines whether or not the PIN is valid. If not, then user gets another chance to enter the PIN via action block 509. If the PIN is valid, then the user gets an audible or visual confirmation of the dollar limit established (action block 503). Following action block 503 test 601 (FIG. 6) is entered.

Figure 6:
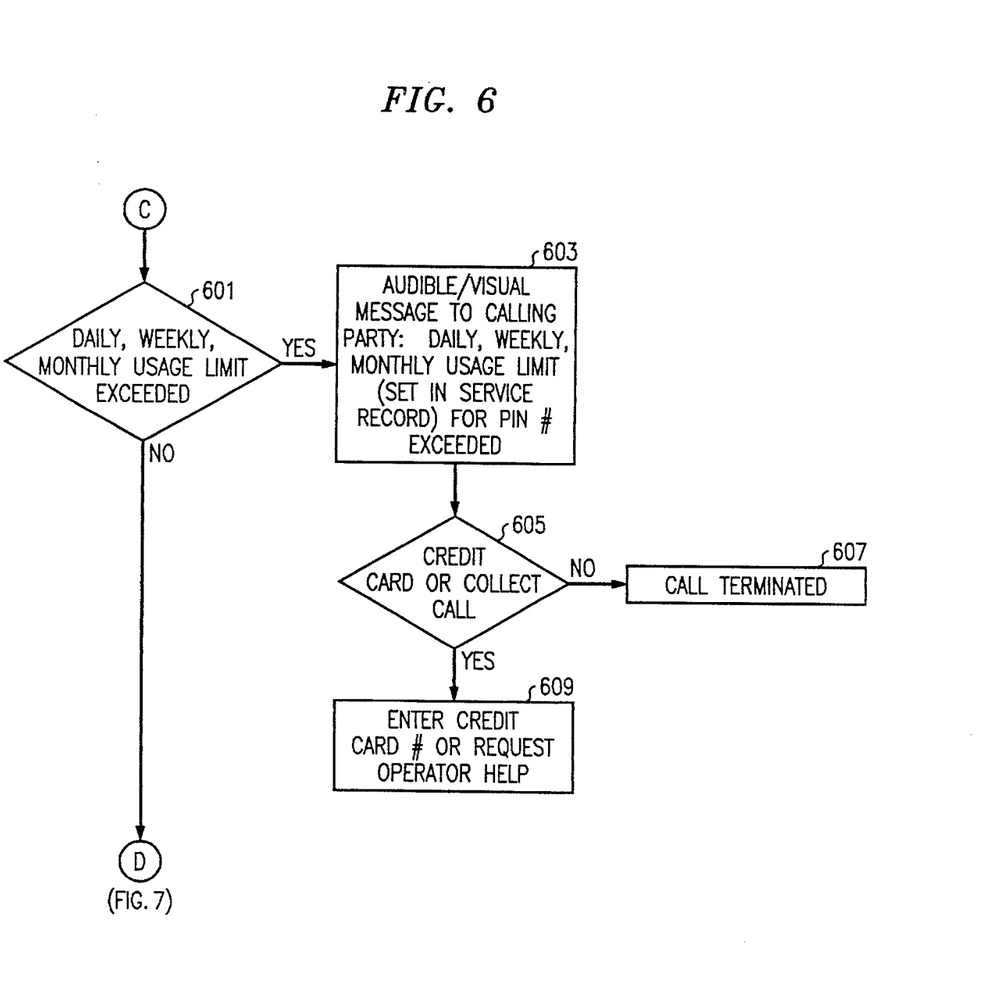

Test 601 determines whether the daily, weekly, or monthly usage limit prescribed by the customer record has been exceeded. If not, then test 701 (FIG. 7) to be described subsequently is entered. If the daily limit has been exceeded, then an audible or visual message is sent to the calling party. The audible or visual message indicates that the daily usage limit has been exceeded (action block 603). Test 605 is then entered to determine if this is a credit card or a collect call. If not, test 611 is used to determine whether the caller has a daily, weekly, or monthly limit override. If not, the call is terminated (action block 607). If the caller does have an override, then the caller is prompted for an override code (action block 613). Test 615 determines whether the correct override code is received. If so, the call processing is continued (action block 700, FIG. 7); if not, the call is terminated (action block 607).

Figure 7:
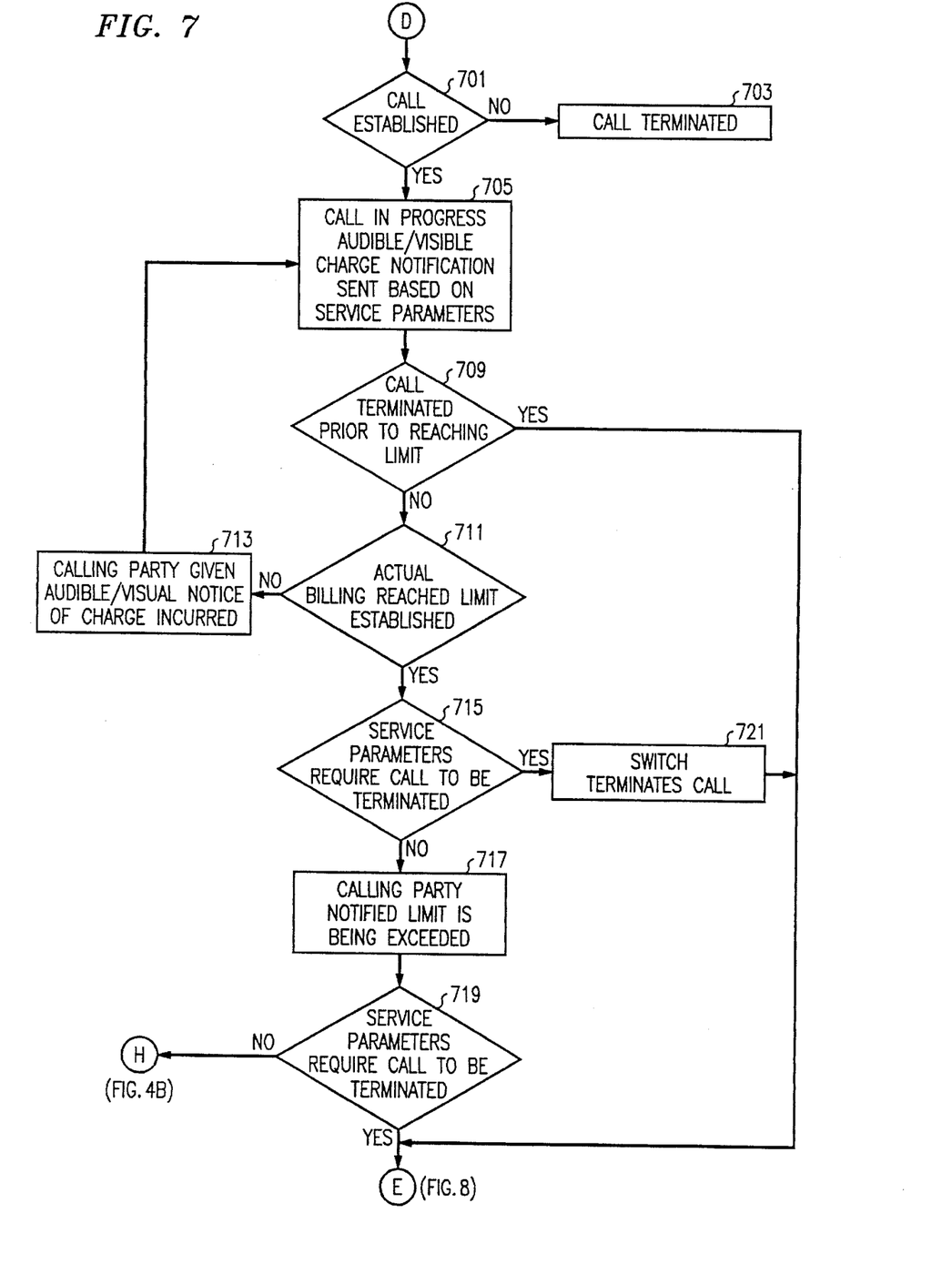

However, if this is a credit card or a collect call, then the credit card number should be entered or the assistance of an operator should be sought (action block 609), after which the call is processed normally including any limits specified for that call (action block 700, FIG. 7). A caller on the credit card call or on a collect call may wish to have an indication of whether a particular prespecified charge is being exceeded, but may choose to make the call anyway even if the limit specified in the customer records is being violated. Of course, in the case of a collect call, the called party may be willing to go beyond the limits specified for the caller.

Figure 8:
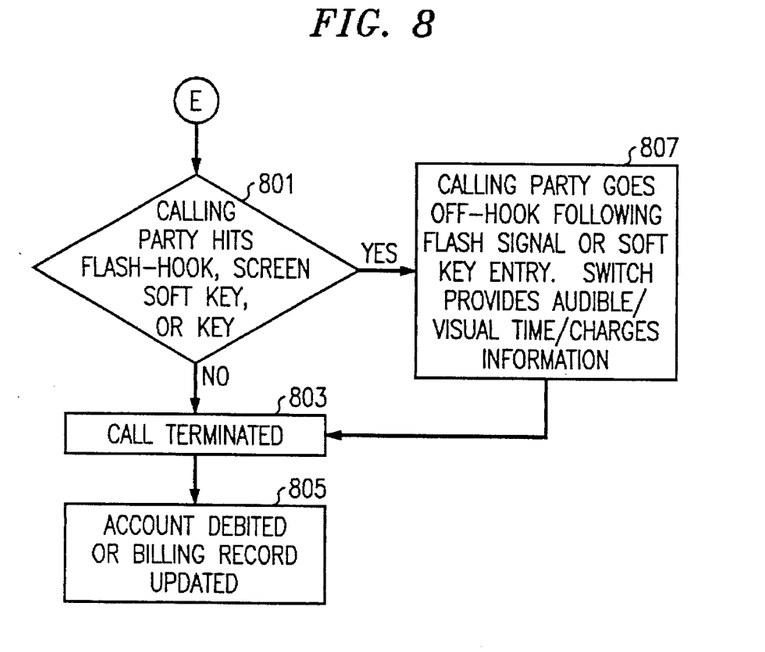

As indicated above, if the limits for the call are not being exceeded, then action bock 700 is entered. Action block 700 indicates that the caller specifies the called number, by dialing using a regular telephone 1, or by keying using one of the other telephones 3, 5. Test 702 determines whether this is a special emergency call; if so, the limits are simply cancelled for this call. Test 703 determines whether or not the call can be established. If the call cannot be established, then the call is terminated (action block 704). If the call is established, then while the call is in progress action block 705 is entered. Test 709 determines if the call is terminated prior to reaching the limit. If so, then test 801 on FIG. 8 is entered. If not, then test 711 is used to determine whether the active billing limit has been reached. If not, then periodically the calling party is given an audible or a visual indication of the charge incurred so far (action block 713). If the active billing limit has been reached, then test 715 is entered to determine whether service parameters require the call to be terminated. If so, test 801, FIG. 8, described hereinafter, is entered. If the service parameters indicate that the call need not be terminated when the limit is reached, then the calling party is notified that the limit is being exceeded (action block 717) and test 719 is entered to determine whether the caller wishes to establish a new limit. If so, then block 425 of FIG. 4 is reentered to allow the customer to establish an additional dollar amount limit. If the caller does not wish to establish a new limit, then test block 801 of FIG. 8 is entered.

Test 801 determines whether the calling party briefly depresses the switchhook ("flash") or provides an equivalent signal from a PC or an ADSI telephone. If not, then the call is simply terminated (action block 803) and the caller's account is debited or the billing record is updated. Account debiting is used for those cases in which the customer establishes a specific account against which telephone charges may be incurred. When this account reaches zero, no more calls can be made until the account is replenished (if the calling party flashes, (positive result of test 801) then the central office 10 provides the customer with an audible or visual indication of the time and charges for that call. The call is then terminated (action block 803).

Figure 9:
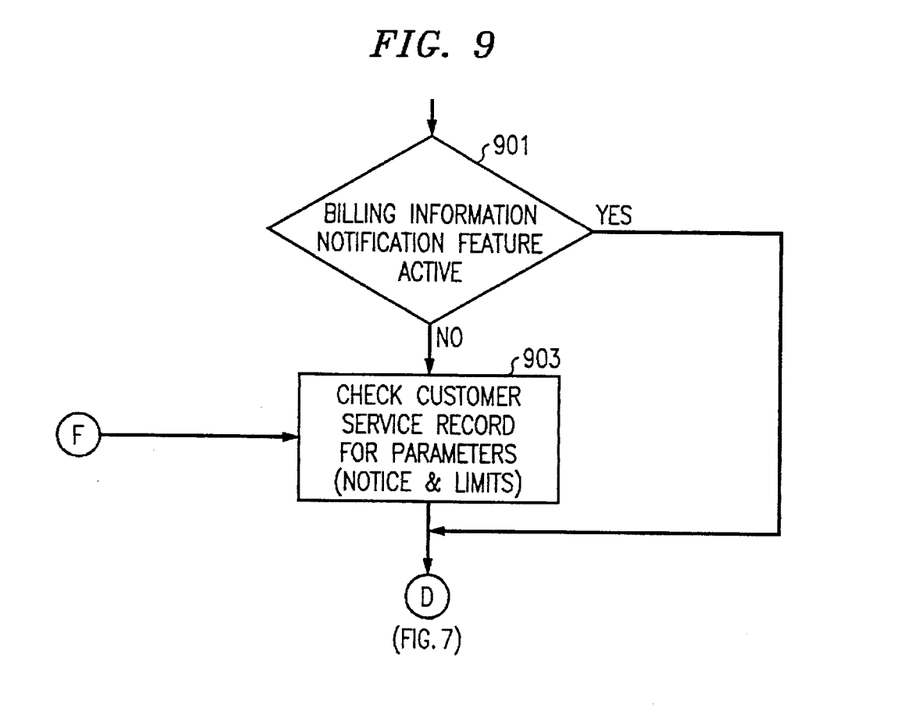

FIG. 9, block 901 is entered from block 405 of FIG. 4. This is the case in which the caller did not dial *46. If the caller has a billing information notification feature that is active, then block 701, FIG. 7 is entered so that the caller can be notified about the call without having limited the charges to be incurred on this call. If the billing notification feature is not active, then the customer service record is checked for parameters in indicating overall limits, both for calls and cumulative and notice provisions (action block 903). These parameters are then stored for use in subsequent actions taken for that call and action block 701 and test 701 (FIG. 7) is entered.

Figure 10:
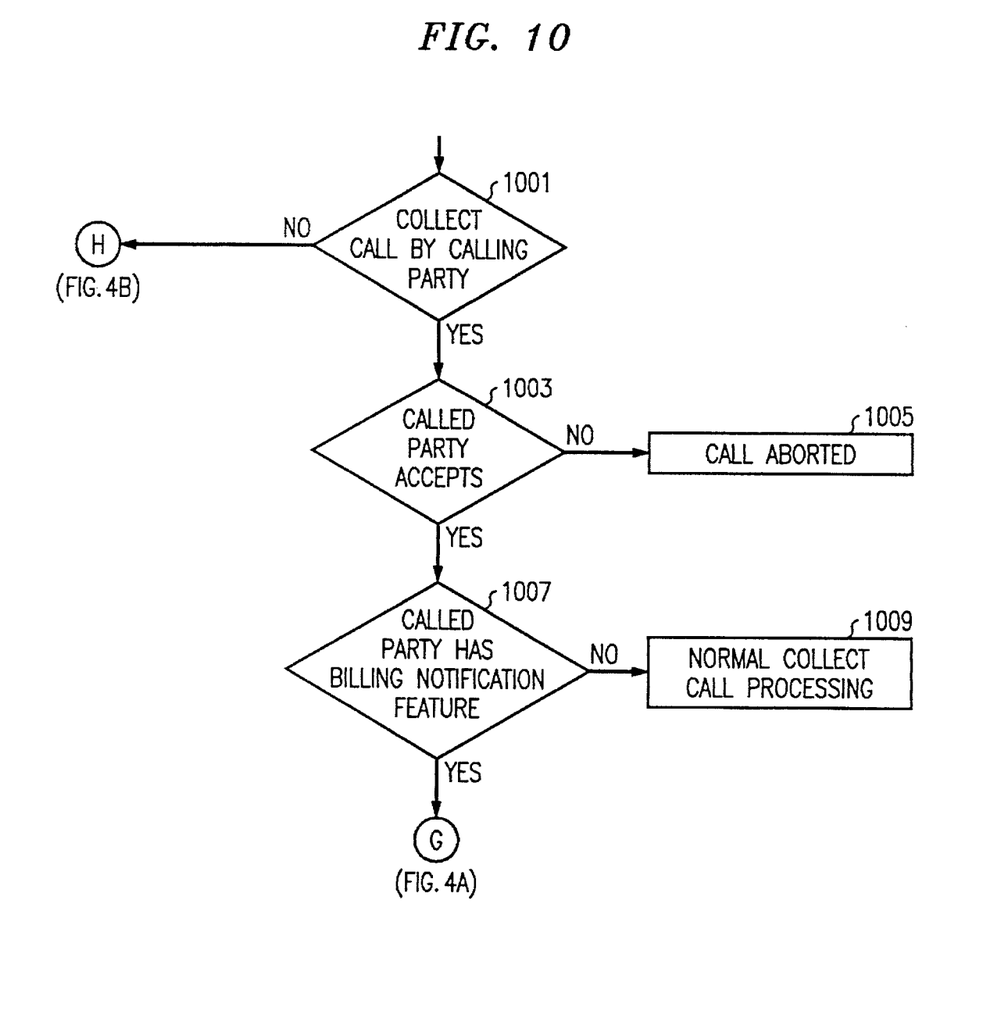

FIG. 10 indicates the special actions performed for collect calls. Following the dialing of a collect call, (action block 1001) Test 1003 is then used to determine whether the called party accepts the call; if not, the call is aborted. If the called party accepts the call, then test 1007 is used to determine whether the called party has a billing notification feature or wishes to invoke the feature by entering a feature code such as *22 (1122 for rotary telephones). If the called party does not have this feature, normal collect call processing is entered (action block 1009). If the called party does have this feature, then test 405 (FIG. 4) is entered and the called party has a chance to request charge limiting.

The concept of notifying a caller when a specified charge limit is being approached can also be used for credit card calls, person calls, or other calls; the caller simply specifies the charge limit and receives notifications, as discussed herein, when that limit is approached.

It is to be understood that the above description is only of one preferred embodiment of the invention. Numerous other arrangements may be devised by one skilled in the art without departing from the scope of the invention. The invention is thus limited only as defined in the accompanying claims.

I claim:

1. In a telecommunications network, a method of managing call charges comprising the steps of:

specifying a tentative limit for charges to be incurred on a telecommunications call between a calling party and a called party, comprising the steps of testing if said telecommunications call is a collect call, and if the result of said testing is that said telecommunications call is a collect call, obtaining said tentative limit from said called party, and if the result of said testing is that said telecommunications call is not a collect call, obtaining said tentative limit from said calling party;

specifying a destination for said call;

establishing said call;

maintaining in said network a running indication of accumulated telecommunications charges for said call.

2. The method of claim 1 wherein prior to a time when said accumulated charges equal or exceed said limit, the party that specified said limit receives an indication.

3. The method of claim 2 wherein the step of receiving an indication comprises receiving a tone.

4. The method of claim 2 wherein said step of receiving an indication comprises receiving an announcement.

5. The method of claim 2 wherein the step of receiving an indication comprises receiving data for controlling a visual indication.

6. The method of claim 1 further comprising the step of: disconnecting said call when said indication of accumulated telecommunications charges equals or exceeds said limit.

7. The method of claim 1 further comprising the step of:

storing class information for said calling party and said called party, said class information specifying treatment of calls which exceed said limit.

8. The method of claim 7 wherein said class information comprises one or more personel identification numbers for overriding said limit.

9. The method of claim 1 further comprising the steps of specifying a cumulative tentative limit for all calls placed during a period of time and maintaining a running indication of accumulated telecommunications charges for calls made during said period of time and testing whether said accumulated charges for said period exceed said cumulative tentative limit.

10. In a telecommunications network, including a switching system hosting a plurality of lines connected to a plurality of telephones, a method of managing call charges comprising the steps of:

specifying a subscriber designated charge increment at which said subscriber is to be notified of charges;

storing said designated charge increment;

accessing said designated charge increment by the switching system when said subscriber initiates a call;

obtaining billing information at the switching system for said call;

monitoring the call and maintaining accumulated charges for the call in accordance with said billing information; and notifying said subscriber every time said accumulated charges exceed said designated charge increment.

11. The method of claim 10, wherein the step of notifying occurs periodically during the call.

12. In a telecommunications network having a switching system hosting a plurality of lines connected to a plurality of telephones, a method of managing call charges comprising the steps of:

specifying desired charge limits for multiple calls per unit time for a customer;

storing said desired charge limits per unit time for said customer;

accessing said desired charge limits per unit time by the switching system upon a request by said customer;

obtaining billing information at the switching system when said customer initiates a call and makes said request;

monitoring the call and maintaining accumulated charges for the call; and notifying the customer when the accumulated charges reach said desired charge limits.

13. The method according to claim 12, wherein said unit time is a day.

14. The method according to claim 12, wherein said unit time is a plurality of days.

15. In a telecommunications network having a switching system hosting a plurality of lines connected to a plurality of telephones, a method of managing call charges comprising the steps of:

specifying a first desired charge limit for a first class of call for a customer;

specifying a second desired charge limit for a second class of call for said customer, said second desired charge limit being distinct from said first desired charge limit;

storing said first and second desired charge limits for said customer;

receiving a request by said customer for service and determining whether the actual class of call requested is for said first class of call or said second class of call;

accessing either said first or second charge limits by the switching system based on the determination of the actual class of call;

obtaining billing information at the switching system;

monitoring the call and maintaining accumulated charges for the call; and notifying the customer when the accumulated charges reach said desired charge limit for the actual class of call.

* * * * *